May 9, 1967  W. S. HARGETT, JR  3,318,286
FARROWING PEN
Filed June 14, 1965  2 Sheets-Sheet 1

Walter S. Hargett Jr.
*INVENTOR.*

BY
Charles Q. Phillips
ATTORNEY.

May 9, 1967 W. S. HARGETT, JR 3,318,286
FARROWING PEN
Filed June 14, 1965 2 Sheets-Sheet 2

Walter S. Hargett Jr.
*INVENTOR.*

BY
Charles G. Phillips
ATTORNEY.

United States Patent Office 3,318,286
Patented May 9, 1967

3,318,286
FARROWING PEN
Walter S. Hargett, Jr., 4816 Cutler Drive NW.,
Huntsville, Ala. 35810
Filed June 14, 1965, Ser. No. 463,640
1 Claim. (Cl. 119—20)

This invention relates to farrowing pens and primarily to a farrowing pen of novel construction which will assure that pigs are not injured during and after birth.

While farrowing pens have been constructed in many different forms, the farrowing pen of the present invention is intended to provide many features which will permit her to stand up or sit down at ease prior to and after giving birth to pigs but yet will prevent the sow from raising up and falling over while giving birth to the pigs.

It is, therefore, an object of the present invention to provide a device of the character described comprising a box-like enclosure for sheltering a sow prior to, during, and after giving birth to pigs.

It is a further object of the present invention to provide a farrowing pen having a central sow housing portion which includes sides which are adjustable to variable heights to permit the newborn pigs to enter thereunder into adjacent side portions to be safely sheltered from the sow by assurring that the sow cannot fall or lie on the newborn pigs.

A further object of the present invention is the provision of an adjustable top which encloses the central sow portion. The top being adjustable and movable into a position which will prevent the sow from raising up and falling over during birth and injuring the new or unborn pigs.

Other objects are the ease and economy of construction of the device. The ease of access to any interior portion of the device and the provision of solid sides of the pig pens, allowing rows of identical farrowing pens assemblies to be placed side by side by side and yet providing a barrier between pigs in individual litters to prevent disease from spreading between adjacent litters. And, the provision of easily removable end doors which facilitate cleaning of the interior of the pens.

Other objects and features of the present invention will become more readily apparent from the following detailed description taken in conjunction with the drawings wherein.

Figure 1:
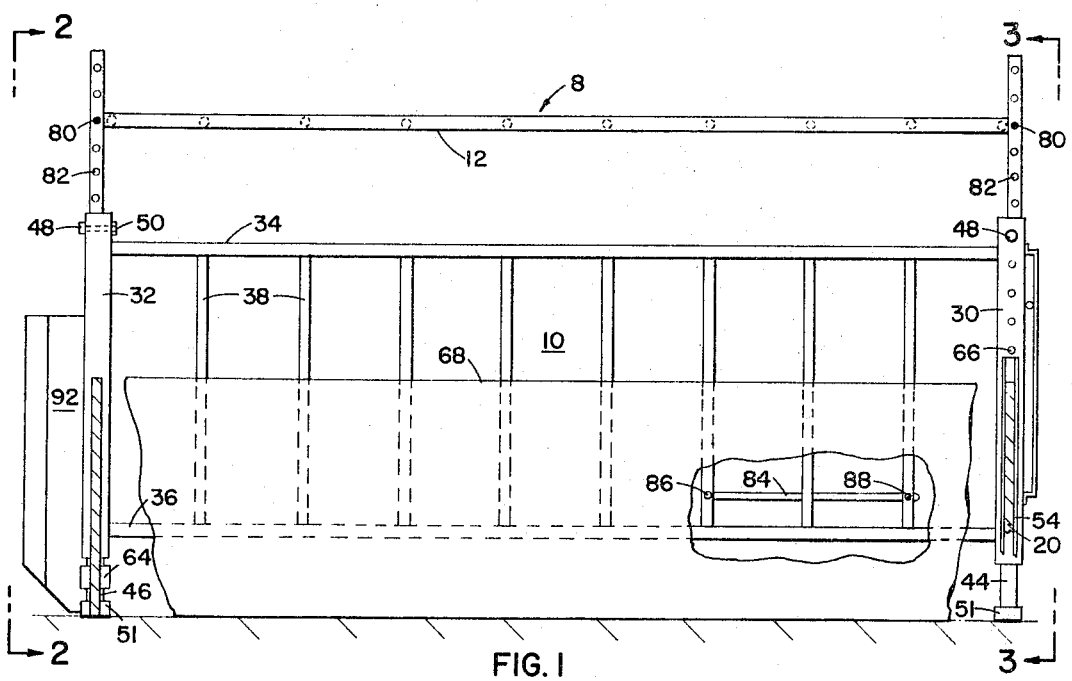
FIGURE 1 is an elevational view of the farrowing pen of the present invention.
Figure 4:
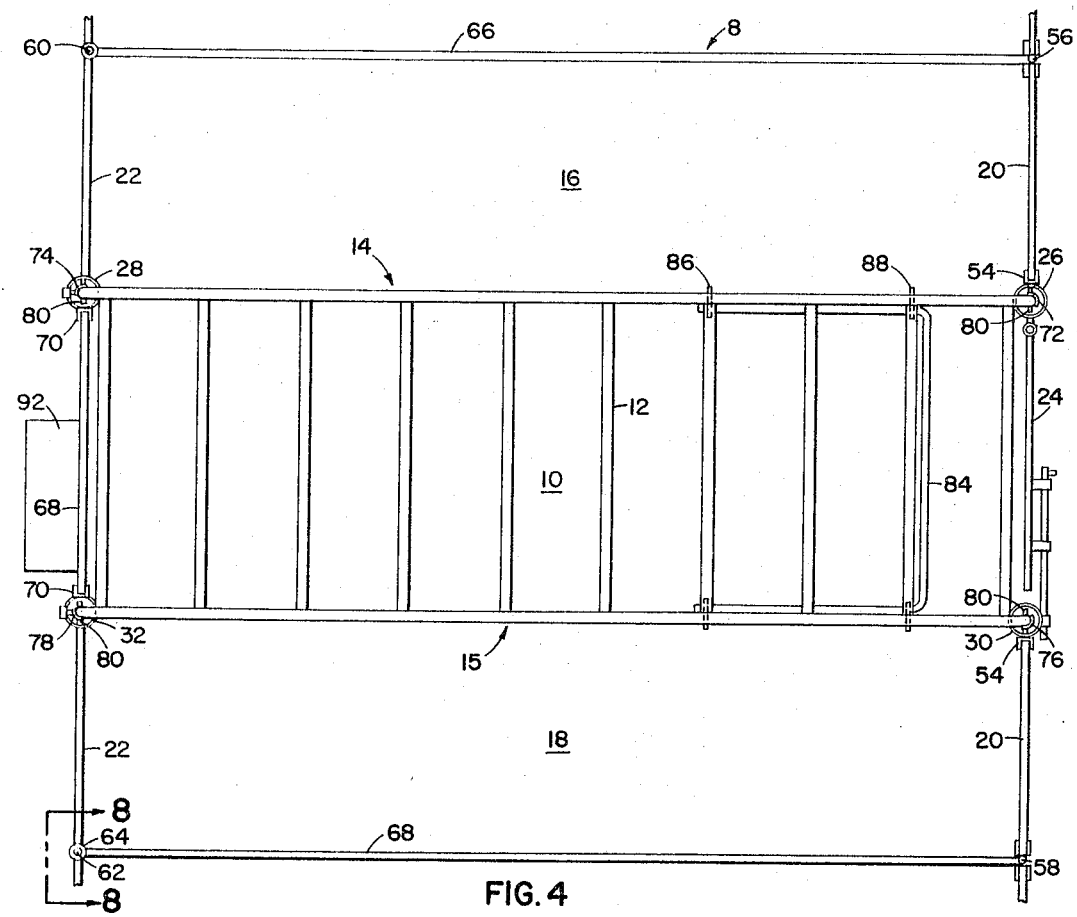
FIGURE 4 is a plan view of the farrowing pen and also illustrates the adjacent side pens for sheltering the newborn pigs.
Figure 5:
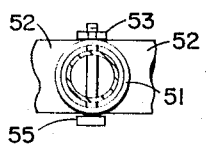
FIGURE 5 is a fragmentary sectional view along line 5—5 of FIGURE 2 illustrating the means for securing the pen to a foundation.
Figure 7:
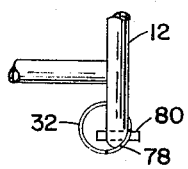
FIGURE 7 is a fragmentary plan view along line 7—7 of FIGURE 2 illustrating the arrangement at the corner posts for permitting separate adjustment of the top portion.
Figure 6:
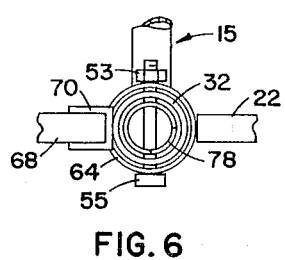
FIGURE 6 is a fragmentay sectional view along line 6—6 of FIGURE 2 and illustrates the means whereby the sides of the farrowing pen are retained in desired position.

Referring now to the drawings and particularly to FIGURES 1 and 4, the pen 8 includes a central sow portion 10 including a vertically adjustable top portion 12 and side rail means 14 and 15. On each side of central portion 10 are two pig pens 16 and 18 for baby pigs. Each of pens 16 and 18 are provided with rear and forward end panels 20 and 22, respectively. Rear panels 20 raise to facilitate cleaning of the pens. A door 24 is provided in central sow portion 10 to permit the sow to enter and leave and also to provide access to the central portion to facilitate cleaning thereof.

Side 14 extends between a pair of vertically movable corner posts 26 and 28, and side 15 extends between a pair of vertically movable corner posts 30 and 32. Sides 14 and 15 include upper and lower horizontal rails 34 and 36 (FIGURE 1) having a plurality of vertical support members 38 secured thereto in parallel spaced relationship.

Figure 2:
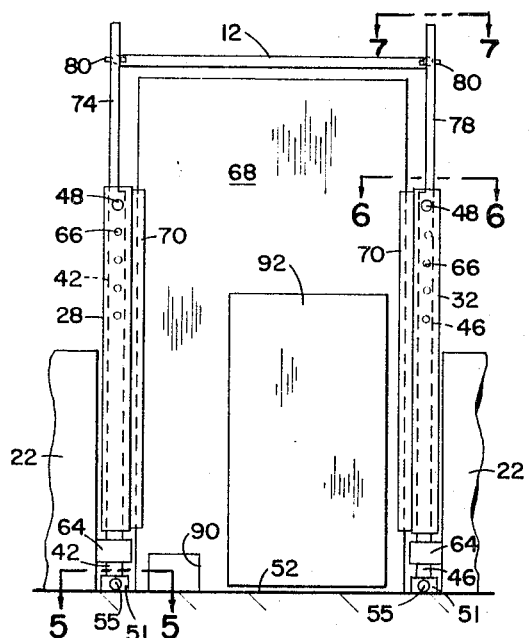
FIGURE 2 is an end view taken along line 2—2 of FIGURE 1.
Figure 3:
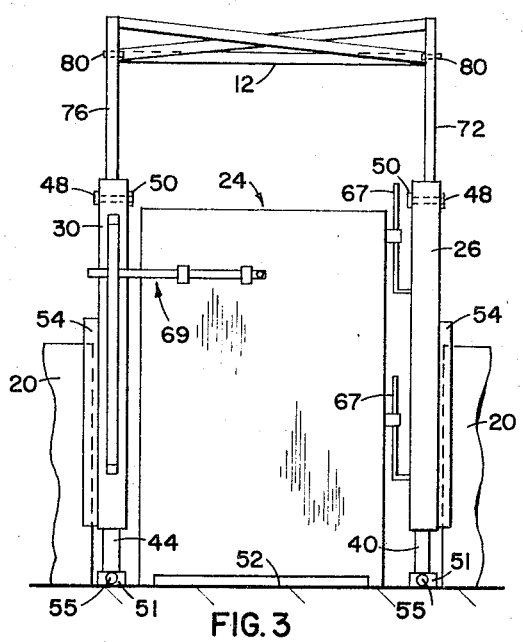
FIGURE 3 is an end view taken along line 3—3 of FIGURE 1.

The corner posts 26, 28, 30 and 32 are supported in telescoped relation over corner stanchions 40, 42, 44 and 46, respectively. The corner posts are adjustably secured to the stanchions by means of a nut and bolt 48 and 50 (FIGURE 1). As shown more clearly in FIGURES 2 and 3 the stanchions are secured to a foundation by inserting the stanchions in a collar 51 and securing the stanchions therein by means of a nut and bolt 53 and 55. The collar is welded to a steel strap 52 which engages the foundation and is secured thereto. The strap extends between the collars of stanchions 42 and 46, and stanchions 40 and 44, respectively, and, typically, would extend continuously to connect adjoining crates.

Figure 8:
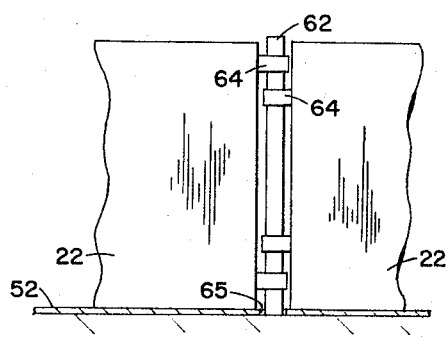
FIGURE 8 is an elevational sectional view along line 8—8 of FIGURE 4 illustrating the side pen assemblies.

To provide for assembly of the side pen 16 and 18, corner posts 26 and 30 are provided with a channel member 54 secured thereto. Front panels 20 are slidably supported in a pair of outer side pen channel posts 56 and 58, respectively. Posts 56 and 58 are secured in a hole bored in strap 52. Front panels 22 extend laterally from stanchions 42 and 46 to side pen corner supports 60 and 62, respectively. The front panels are secured to the stanchions 42 and 46 by means of cylindrical projections or collars 64 which extend from the front panels to encircle the stanchions. Panels 22 are secured to side pen corner supports 60 and 62 in a similar manner as shown in FIGURE 8. The corner posts 60 and 62 are inserted through projections 64. Posts 60 and 62 are secured in a hole bored in strap 52.

To enclose the side pens a pair of partitions 66 and 68 extend between posts 56 and 60, and 58 and 62, respectively, and are secured thereto. The partitions are of solid one-piece construction to permit rows of identical farrowing pens to be placed side by side and yet provide a barrier between pigs in individual litters to prevent disease from spreading between adjacent litters.

As previously stated sides 14 and 15 of central sow portion 10 may be raised to permit the pigs to enter the side pens. The height may be varied by the telescoping arrangement of the corner posts over the stanchions. When the desired height is reached bolt 48 is inserted through one of the plurality of holes 66 in the corner posts and stanchions and the nut is threaded to the bolt to secure the sides to the desired height. It will be noted that door 24 is supported on a pair of long arm members 67 secured to corner post 26 to permit the vertical movement of post 26. Latch mechanism 69 retains the door in closed position while permitting the vertical movement of post 30.

To complete the enclosure of sow portion 10 a front plate 68 is slidably carried in a pair of channel members 70 which is secured to corner posts 28 and 32 respectively. This structure permits the vertical movement of corner posts 28 and 32 during the adjustment of side portions 14 and 15.

An important feature of the present invention is the provision of a separately adjustable top for sow portion 10. This adjustability is achieved by removing about three-fourths of upper portions of stanchions 40, 42, 44 and 46 to leave a one quarter round portion 72, 74, 76 and 78. Top member 12 is postioned to the desired height and retained in this position by means of a pin 80 which extends from each of the four corners of top member 12 and projects into the desired one of a plurality of holes 82 to retain the top at the desired height.

An additional feature of the present invention is the provision of a substantially U-shaped member 84 which is pivotally secured adjacent the rear end of the central sow portion, between a pair of support members 38 by means of a pin 86. Member 84 is raised to permit entry of the sow into the pen and is lower and secured to another pair of the supports 38 by means of a pin 88. Member 84 prevents the sow from backing into the end of central portion 10 and injuring any of the pigs which might be between the sow and the end portion of the pen.

An opening 90 (FIGURE 2) is provided in the front panel 68 for watering the sow and a feeding trough 92 is provided in front panel 68 to provide a means for feeding the sow.

While the present invention has been described with particularity, it is to be understood that various modifications thereof may be resorted thereto without departing from the spirit and scope of the present invention as set forth in the following claim.

I claim:

A farrowing pen comprising: a base; a pair of spaced end members; a plurality of stanchions each secured to said base; a plurality of corner posts, one post slidably mounted on each stanchion; a first side rail means extending between a first pair of said corner posts and disposed for vertical movement therewith; a second side rail means extending between a second pair of said corner posts and disposed for vertical movement therewith; said spaced end members being slidably secured with the posts whereby said end members and said side rail means enclose a substantially rectangular central portion means for securing said side rail means to said posts; means for slidably supporting said posts on said stanchions and including means for adjusting the vertical position of said posts at a desired height from said base; a top member including vertical adjustment means for securing said top member to said stanchions in a vertically adjustable relation at a plurality of fixed elevations, said top member being disposed for vertical movement independent of the vertical adjustment of said posts; a pair of side pens each respectively disposed on opposite sides of said central portion; a collar at each corner of said end members, each of said stanchions being mounted in one of said collars; means securing said stanchions to said collars; and said base comprising a first strap extending between said collars positioned at corners of one of said end members and a second strap extending between said collars positioned at corners of the other of said end members.

References Cited by the Examiner

UNITED STATES PATENTS

| 3,077,861 | 2/1963 | Eide | 119—20 |
| 3,125,988 | 3/1964 | King | 119—20 |
| 3,191,577 | 6/1965 | McMurray | 119—16 |

FOREIGN PATENTS 47,870   10/1933   Denmark.

SAMUEL KOREN, *Primary Examiner.*

HUGH R. CHAMBLEE, *Examiner.*